(12) United States Patent
Albertelli (10) Patent No.: US 6,980,249 B2
(45) Date of Patent: Dec. 27, 2005

(54) WIDE-FIELD EXTENDED-DEPTH DOUBLY TELECENTRIC CATADIOPTRIC OPTICAL SYSTEM FOR DIGITAL IMAGING

(75) Inventor: Lawrence E. Albertelli, Owego, NY (US)

(73) Assignee: Lockheed Martin, Corporation, Bethesda, MD (US)

( * ) Notice: Subject to any disclaimer, the term of this patent is extended or adjusted under 35 U.S.C. 154(b) by 802 days.

(21) Appl. No.: 09/838,682

(22) Filed: Apr. 20, 2001

(65) Prior Publication Data

US 2002/0008139 A1    Jan. 24, 2002

Related U.S. Application Data

(60) Provisional application No. 60/198,764, filed on Apr. 21, 2000.

(51) Int. Cl.[7] .............................................. H04N 5/225
(52) U.S. Cl. ..................... 348/335; 359/663
(58) Field of Search ............................. 348/335, 340, 348/343, 344; 359/663; 382/147, 142

(56) References Cited

U.S. PATENT DOCUMENTS

| | | |
|---|---|---|
| 4,165,149 A | 8/1979 | Suzki et al. |
| 4,199,219 A | 4/1980 | Suzki et al. |
| 4,592,625 A | 6/1986 | Uehara et al. |
| 4,851,698 A | 7/1989 | Hippenmeyer |
| 4,855,987 A | 8/1989 | Versluis |
| 5,007,096 A * | 4/1991 | Yoshida ....................... 382/142 |
| 5,136,429 A | 8/1992 | Bergner et al. |
| 5,159,172 A | 10/1992 | Goodman et al. |
| 5,696,631 A | 12/1997 | Hoffman |
| 5,697,504 A | 12/1997 | Hiramatsu et al. |
| 5,699,164 A | 12/1997 | Lehan et al. |
| 5,708,532 A | 1/1998 | Wartmann |
| 5,715,050 A | 2/1998 | Haga |
| 5,748,305 A | 5/1998 | Shimono et al. |
| 5,805,347 A | 9/1998 | Mizutani et al. |

(Continued)

FOREIGN PATENT DOCUMENTS

EP       0 747 743 A1     12/1996

(Continued)

*Primary Examiner*—Tuan Ho
(74) *Attorney, Agent, or Firm*—Whitham, Curtis & Christofferson, P.C.

(57) ABSTRACT

Focused imaging of constant size and resolution over a wide range of distances and a wide field of view in object space is provided by a doubly telecentric catadioptric optical system including an external limiting aperture at the juncture of the focal planes of two objectives, with a large-diameter concave spherical or aspheric mirror as the primary objective, and a camera lens as the secondary objective. Constant resolution avoids rescaling of images made at different depths for machine recognition tasks such as OCR, saving computation time and cost, and increasing through-put and accuracy. For digital linescan cameras, constant resolution of the image avoids scanning objects at different line rates for different depths of objects being scanned, thus maximizing speed of the objects and, hence, throughput. The field of view is constant over the entire range of depth and is not limited by the diameter of the camera lens elements. Undesirable cropping of the image of objects close to the imaging system is prevented. The effective f/number of the system is constant over the entire range of focus, and the image irradiance is more uniform over the entire field of view than with a traditional non-telecentric camera lens.

19 Claims, 5 Drawing Sheets

U.S. PATENT DOCUMENTS

| | | |
|---|---|---|
| 5,822,042 A | 10/1998 | Goodman et al. |
| 5,854,780 A | 12/1998 | Opheij et al. |
| 5,856,884 A | 1/1999 | Mercado |
| 5,912,768 A | 6/1999 | Sissom et al. |
| 5,956,182 A | 9/1999 | Takahashi |
| 6,005,974 A | 12/1999 | Kochi et al. |
| 6,081,613 A * | 6/2000 | Ikurumi et al. .............. 382/147 |
| 6,271,972 B1 * | 8/2001 | Kedar et al. ................ 359/663 |

FOREIGN PATENT DOCUMENTS

| | | |
|---|---|---|
| JP | 6-222265 | 12/1994 |

* cited by examiner

WIDE-FIELD EXTENDED-DEPTH DOUBLY TELECENTRIC CATADIOPTRIC OPTICAL SYSTEM FOR DIGITAL IMAGING

CROSS-REFERENCE TO RELATED APPLICATION

This application claims priority to U.S. Provisional Application Ser. No. 60/198,764, filed Apr. 21, 2000, the entire contents of which are hereby incorporated by reference herein.

BACKGROUND OF THE INVENTION

1. Field of the Invention

The present invention generally relates to optical systems for automated imaging and, more particularly, to optical systems for digital imaging for optical character recognition (OCR), automated inspection, optical metrology (e.g. object identification and classification), machine vision, robotics, bar code readers (BCRs) and the like.

2. Description of the Prior Art

Many different types of optical systems including one or more lenses and/or mirrors and structure to maintain or adjust the relative positions of such optical elements have been known for many years for various applications, including telescopes, microscopes and human vision correction. Cameras generally combine such optical systems with an arrangement to position a radiation sensitive film or electronic sensor positioned relative to the focal plane of the optical system. Cameras using electronic sensors have recently become very popular as a substitute for film-based cameras and have also found substantial utility in various automated image capture applications such as vision-based control systems, BCRs and OCR systems.

Many different types of optical systems are known and have different properties which may be of potential relative advantage in particular applications. However, application of some types of optical systems to purposes in which they might be otherwise advantageous may be precluded by corresponding constraints. As a simple example, large fields of view must generally be provided by wide-angle lenses which characteristically exhibit substantial distortion that increases with off-axis angle. Correction of such distortion is often only possible with expensive aspheric elements or through the use of image processing which is expensive.

Long focal length lenses at considerable distances from an object to be imaged have been used to restrict the relative change in resolution over a large change in object position along the optical axis but this can be impractical where space is a limitation and may require the use of multiple path-folding mirrors of high optical quality which are expensive and ultimately reduce overall image quality because of surface irregularities. This is, at best, only a partial solution since the resolution will still be relatively high at relatively closer object positions thus limiting unnecessarily the ultimate scan rate of the image capture device. Therefore, some types of lens systems exhibiting some potentially useful properties have little or no known practical application and are often, at most, of theoretical interest.

So-called telecentric optical systems are exemplary of systems having unique properties but which are severely constrained in application. An article entitled "Optical Design and Specification of Telecentric Optical Systems" by Michael A. Pate, Proc. SPIE, Vol 3482, pp. 877–886, Jun. 8–12, 1998, which is hereby fully incorporated by reference, notes that the objective lens must be larger than the field of view or object of interest and that telecentric optical systems have principal utility in measurement and fabrication of three-dimensional parts. The article also notes that while telecentric lenses were independently discovered in 1848 (Porro) and 1878 (Abbe), telecentric optical system design is not well known or published; stating that the published literature is "very elementary" and "current optical design literature uses anywhere from one sentence to one paragraph to describe and define telecentric optical system design".

By definition, telecentric optical systems fall into two main categories, image telecentric systems and object telecentric systems. Image telecentric systems have an aperture located at the front focal plane of the objective lens such that the chief ray from any object point passes through the center of the aperture and emerges parallel to the optical axis in image space and perpendicular to the image plane (exit pupil at infinity). Object telecentric systems have an auxiliary lens (or mirror) which is located such that its back focal plane coincides with the entrance pupil of the objective lens such that the chief ray from any object point is parallel to the optical axis in object space (entrance pupil at infinity). These two categories can be combined to form a hybrid system known as a doubly telecentric system. This geometry provides the theoretical property of providing constant size imaging over a range of distances of an object from the optical system. Thus the image of an object formed by a doubly telecentric system will be substantially isometric or orthographic (whereas an image made with a non-telecentric system will have substantially a single vanishing point perspective).

However, telecentric optical systems, in practice, fall into two groups and a combination or hybrid group, each having a combination of severe constraints. Object telecentric optical systems, which require an auxiliary objective, are telecentric on the object side of the objective only and utilize the aperture of the camera objective lens. Practical use of object telecentric optical systems relies on depth of field (implying a small aperture and limited light-gathering ability) and constant focus. As long as focus does not change, the center of blur (circle of confusion) of an imaged point from an object will remain stationary in the image plane as the object being imaged is moved along the lens system axis.

That is, within a relatively shallow depth of field and for a field smaller than the auxiliary lens diameter, the image of an object will be of constant size over a range of axial motion of the object. However, the property of a constant size image is lost if the system is refocused in accordance with such axial motion. Therefore, an extremely restrictive range of axial motion (within the depth of field at a given object distance) and object size (limited by the diameter of the auxiliary lens) must be observed in order to render focused detail of the object at constant image size.

As an example of such limitations, U.S. Pat. No. 4,851,698 to Hippenmeyer discloses use of an object telecentric system for measuring separation of features on an object surface. In this case, a well-focused image is apparently of relatively low importance (in connection with a row camera having a linear array of sensors) so long as the image blur allows determination of the respective centers of blurred image features. The lens diameter must also exceed the distance to be measured on the object but can be extended by a factor of ten along a linear zone corresponding to a row of detectors by use of a concave strip mirror. Further, the system must be recalibrated if it is refocused to closer distances than infinity (which will also reduce usable depth of field, referred to therein as a range of sharpness).

So-called image telecentric optical systems are somewhat the reverse of object telecentric systems. Image telecentric systems have an aperture at the front focal plane. However, unlike object telecentric lenses, alteration of focus does not alter the magnification and size of the image provided that the object and the lens elements remain stationary relative to one another, i.e., if only the image sensor is moved to adjust focus. However, motion of the object along the optical axis results in a change of magnification of the image, focused or unfocused. In essence, an image telecentric lens system has virtually no advantages over an object telecentric lens system and significant further constraints.

Even though known measurement applications use telecentric lens systems at a single focus distance, this may be a critical constraint in regard to some possible applications and further limits use of object and image telecentric lenses in applications where a focused image is of importance. The hybrid configuration alluded to above is referred to as a doubly telecentric optical system and essentially uses both an image telecentric objective coaxially located with an object telecentric objective such that the rear focal plane of the object telecentric objective coincides with the front focal plane of the image telecentric objective with the aperture placed at the juncture of the two focal planes serving as the exit aperture of the object-side objective and the entrance pupil of the image-side objective.

However, it has generally been considered that a doubly telecentric system would be constrained by the constraints characteristic of both object and image telecentric optical systems, especially by the constraint in the field width due to limited width of the object-side objective which is traditionally a refractive lens. Accordingly, little, if any, practical application has been envisioned for doubly telecentric optical systems. The properties of doubly telecentric optical systems do not appear to have been investigated and appear to be considerably less well-known than object or image telecentric systems.

In fact, the above-incorporated article, while otherwise seeking to be a comprehensive overview of telecentric lens design, does not even acknowledge the existence of doubly telecentric optical systems, nor does it include any discussion of the properties or applications of such a configuration. It is also significant that while object telecentric and image telecentric refractive lenses are commercially available, at least in small diameters, doubly telecentric lenses are not similarly available and cannot reasonably be assembled from commercially available object and image telecentric systems.

The above-incorporated article also acknowledges that the large lens sizes required by telecentric optical systems can be extremely expensive since the cost of a lens generally increases as the cube of the diameter. Therefore, while the article acknowledges that image processing by computer is complex and slow, particularly in correcting for distortions of non-telecentric lenses used for making optical measurements, such image processing has been more economical than use of large telecentric optical systems which do not change magnification with lens to object distance, at least for measurement applications.

Nevertheless, digital imaging quantizes the image at least in accordance with scan lines or the array of sensor areas at which image capture can occur. With known and well-understood non-telecentric optical systems, magnification and, hence, resolution vary with changes in distance of an object from the camera lens or focal plane. Even with object telecentric lens systems, resolution will necessarily vary with distance of the object from the lens in the sense that the image will become defocused with change of distance between the object and lens outside a shallow depth of field if the optical system is operated at a fixed focus or, if the lens is refocused, magnification and, hence, resolution will change.

This characteristic of most lenses presents a problem in regard to optical character recognition (OCR), bar code readers (BCRs), feature extraction systems and the like which must also operate from data representing a reasonably well-focused image (e.g. systems which compare image features with templates). This comparison, especially in systems including some degree of adaptive processing, requires constant resolution from one image to the next.

Similarly, optical metrology, requires constant image magnification even where the distance between the object of interest and the optical system may not be well-controlled. Variations from these requirements may also affect the performance of other systems such as bar-code readers and optical inspection systems to varying degrees. Magnification variation with depth/distance also causes severe perspective distortion (particularly when providing wide angles of view) which present severe difficulties for machine vision systems such as vision based guidance systems and robotics. Generally, a relatively wide angle of view is required to accommodate the size of objects of interest while maintaining the overall system (object, lens and camera/sensor) at an acceptable size even though, as alluded to above, distortion is usually increased with wide-angle lenses.

It should also be appreciated, in this regard, that there are some environments where the distance between the lens and features of interest on an object inherently varies widely and cannot be controlled. For example, when using OCR systems to read address information on packages of essentially random sizes, the lens to object distance will necessarily vary as widely as the maximum size to be accommodated since some packages could be very thin or short. In the case of tall packages which would place the address information very close to the lens, the dimensions of the information may exceed the field of view of the optical system.

Further, as OCR and optical metrology techniques are applied to high throughput systems such as mail sorting, the digital image processing overhead to correct for change of magnification with distance and distortion becomes a major limitation on overall system capacity, even when very high speed digital data processors are employed. Such image processing necessarily carries a substantial computational overhead to achieve the effect of essentially discarding data and the resolution that data represents and which could otherwise be utilized to improve machine vision system performance. Additionally, this limitation on throughput carries a significant economic cost in regard to the controlled system which must increasingly be balanced against optical system cost when high throughput is required.

Moreover, OCR, BCR and other machine vision systems must capture a reasonably well-focused image for further processing. It was noted above that object telecentric systems cannot be focused without recalibration of image size and must be used to image objects in a relatively narrow depth of field where focus errors are of a tolerable magnitude. Likewise, image telecentric systems can only be focused at a constant image size by movement of the image plane whereas traditional focusing techniques move either the entire lens or subgroups of elements necessitating movement of the object-side objective in synchrony with the image-side objective. However, any change in object position relative to the objective changes image magnification. This difficulty of focusing even image telecentric systems without changing the magnification is thus seen to be a severe limitation on applicability of telecentric optical systems to environments where well-focused images are required.

SUMMARY OF THE INVENTION

It is therefore an object of the present invention to provide an optical system capable of providing constant magnification and resolution of well-focused images over a significant range of focus and object to lens distances and over a wide field of view.

It is another object of the invention to provide an optical system for digital image capture and processing that does not require software (or modification thereof) to correct for variable resolution and perspective distortion such as keystone distortions.

It is a further object of the invention to provide improved performance and increased throughput of machine vision controlled systems.

In order to accomplish these and other objects of the invention, the present invention in a preferred embodiment provides an optical system comprising a doubly telecentric optical system and a camera. In a particularly preferred embodiment, the camera includes means for shifting a location of an image sensor. In another preferred embodiment, the invention provides an optical system comprising a doubly telecentric optical system having a spherical or aspheric concave mirror or mirror strip as an objective element thereof, an aperture at the juncture of the back focal plane of said mirror and the front focal plane of a traditional camera objective, and a camera including means for shifting a location of an image sensor of a line scan or area scan variety.

The invention also provides a machine vision controlled system including a controllable means for performing a function, a doubly telecentric optical system having a concave mirror as an objective element thereof, a camera including means for shifting a location of an image sensor, and means for processing data derived from said image sensor to control said controllable means.

In another preferred embodiment, the invention provides an optical character recognition system for package imaging comprising a doubly telecentric optical system. Additionally, the invention provides an optical character recognition system for article imaging comprising a doubly telecentric optical system comprising a concave strip mirror; at least one conveyor for transporting articles for view by the doubly telecentric optical system; a camera including a movable image sensor; at least one planar mirror; at least one partially reflecting mirror; a light source; at least one chain line; an image processor for receiving image data from the image sensor of the camera; and a controller.

In a further embodiment, the invention provides a sorting method for articles having visible information on a face of each said article, wherein said articles may be irregularly sized. The steps may comprise: moving, by automation, each article into a doubly telecentric optical system, then making an image of the visible information on each article; recording the image made of the visible information and computerized processing of said recorded image. In a particularly preferred embodiment of the inventive method, zip-code sorting of the articles is performed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
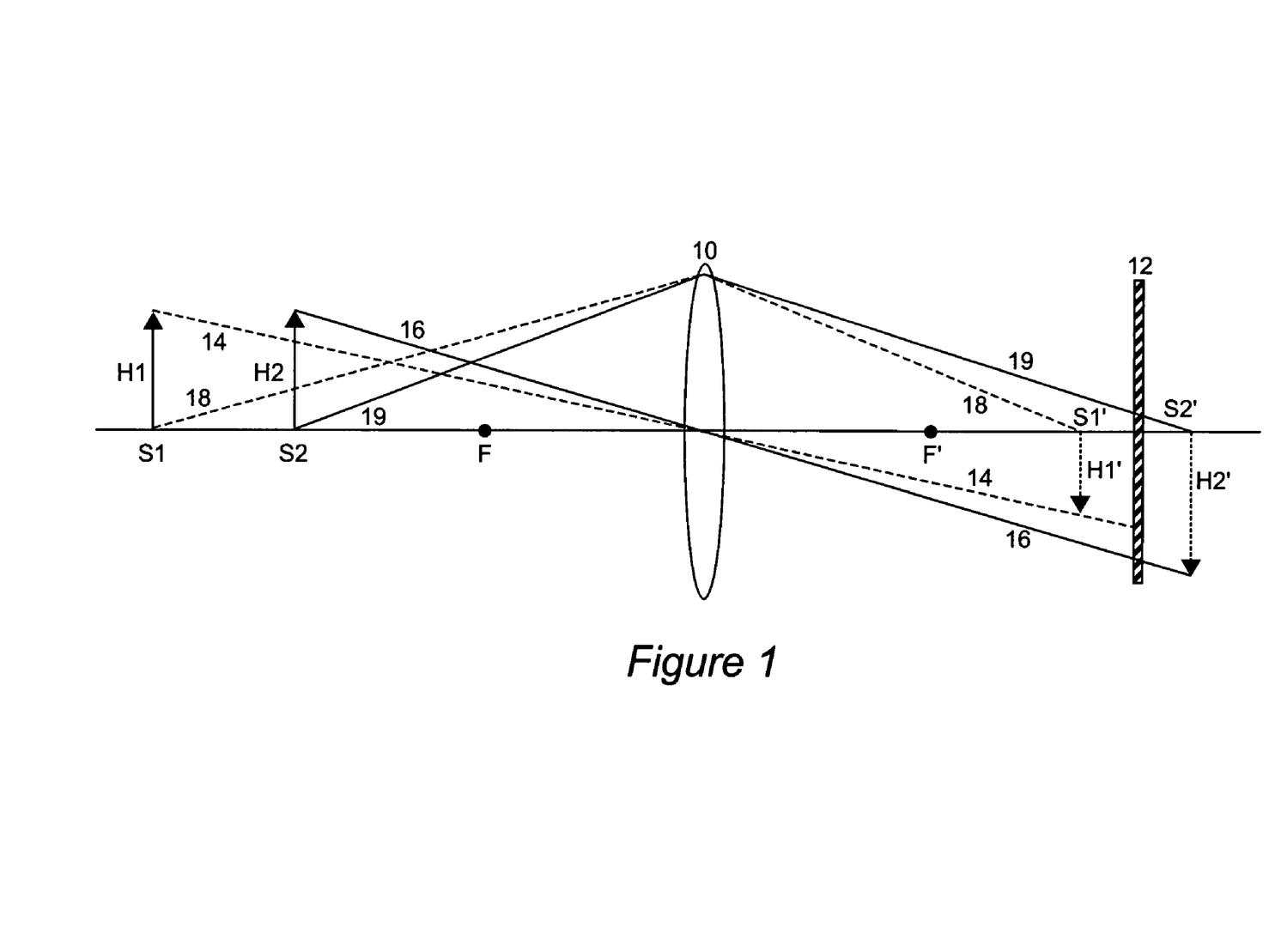
FIG. 1 is a schematic illustration of imaging by a conventional, non-telecentric optical system.

Referring now to the drawings, and more particularly to FIG. 1, there is schematically shown a conventional lens system 10, having front and rear focal points F, F', imaging objects H1, H2 of the same size at different locations S1, S2 which are different axial distances from lens 10. It is understood that H1 and H2 can be representations of the same object positioned at different depths along the optical axis and are shown simultaneously for purposes of comparison. They could also represent two points on a hollow object that are axially separated but of the same height. By following the principal rays from the upper ends of the objects H1, H2 it is seen that the image H1' of object H1 at location S1 at the greater of the two axial distances is focused at location S1' a short distance behind rear focal point F'. By similarly following the illustrated principal ray from the upper end of object H2, it can be seen that image H2' is focused at a greater distance behind rear focal point F' and that the image H2' is much larger than the image H1'.

This difference in size of images of objects at different axial distances from the lens 10 results in magnification and resolution changes in a digital imaging system as an object is placed nearer or farther from the lens. This image magnification change results in the image of a three-dimensional object being rendered in perspective with a single vanishing point and is the reason for "keystone" distortion of the shape of rectangular objects imaged with conventional lens system 10 as the distance increases away from the lens. Note that if the sensor, 12, is placed between images H1' and H2', a blur circle (circle of confusion) is formed on the sensor for each defocused image point. The centers of the blur circles are located at the positions where the principal rays, 14 and 16, intersect the sensor plane 12. Also note that, in general, these are two separate points along the sensor.

Figure 2:
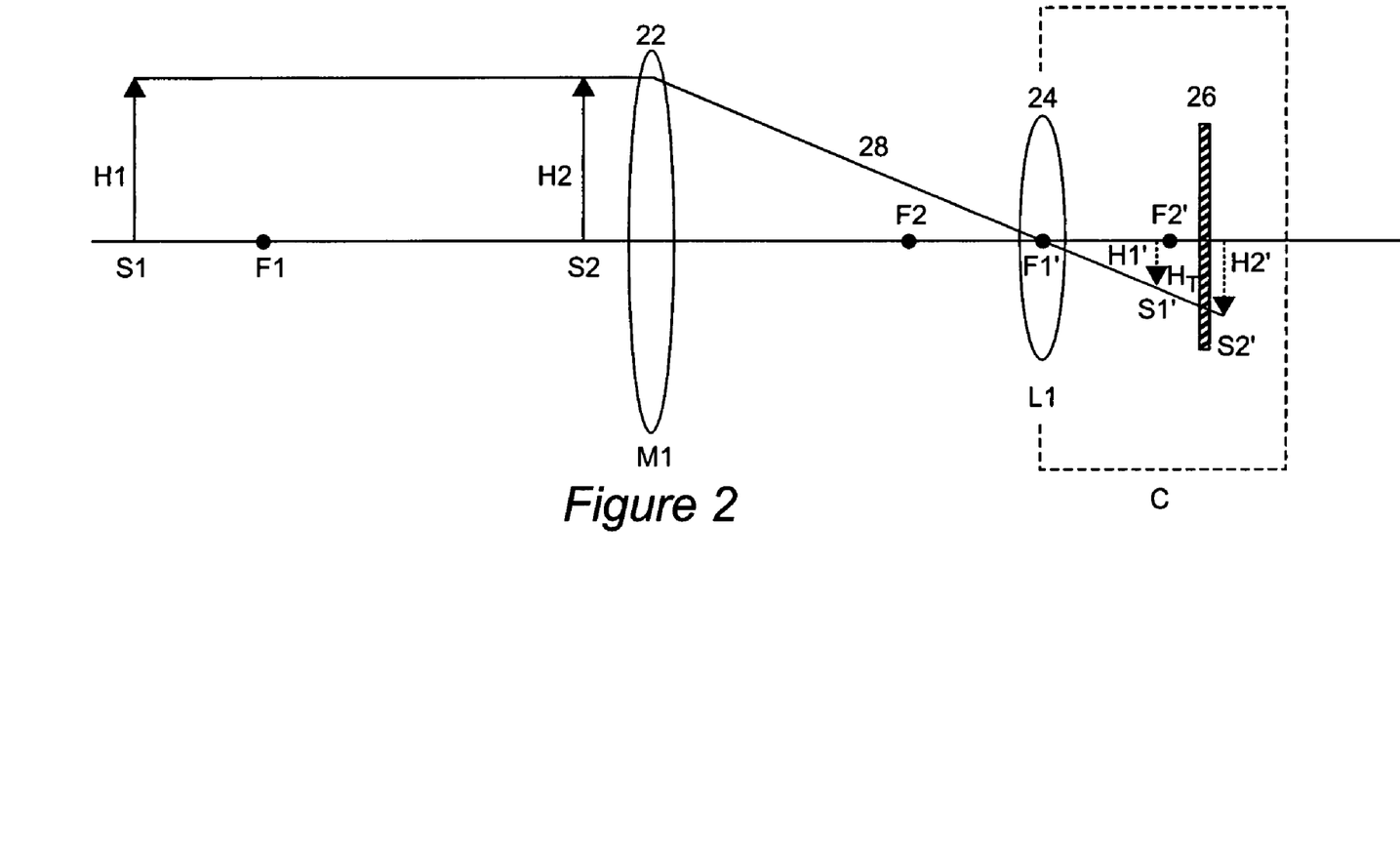
FIG. 2 is a schematic illustration of imaging by a conventional, object telecentric optical system.
Figure 3:
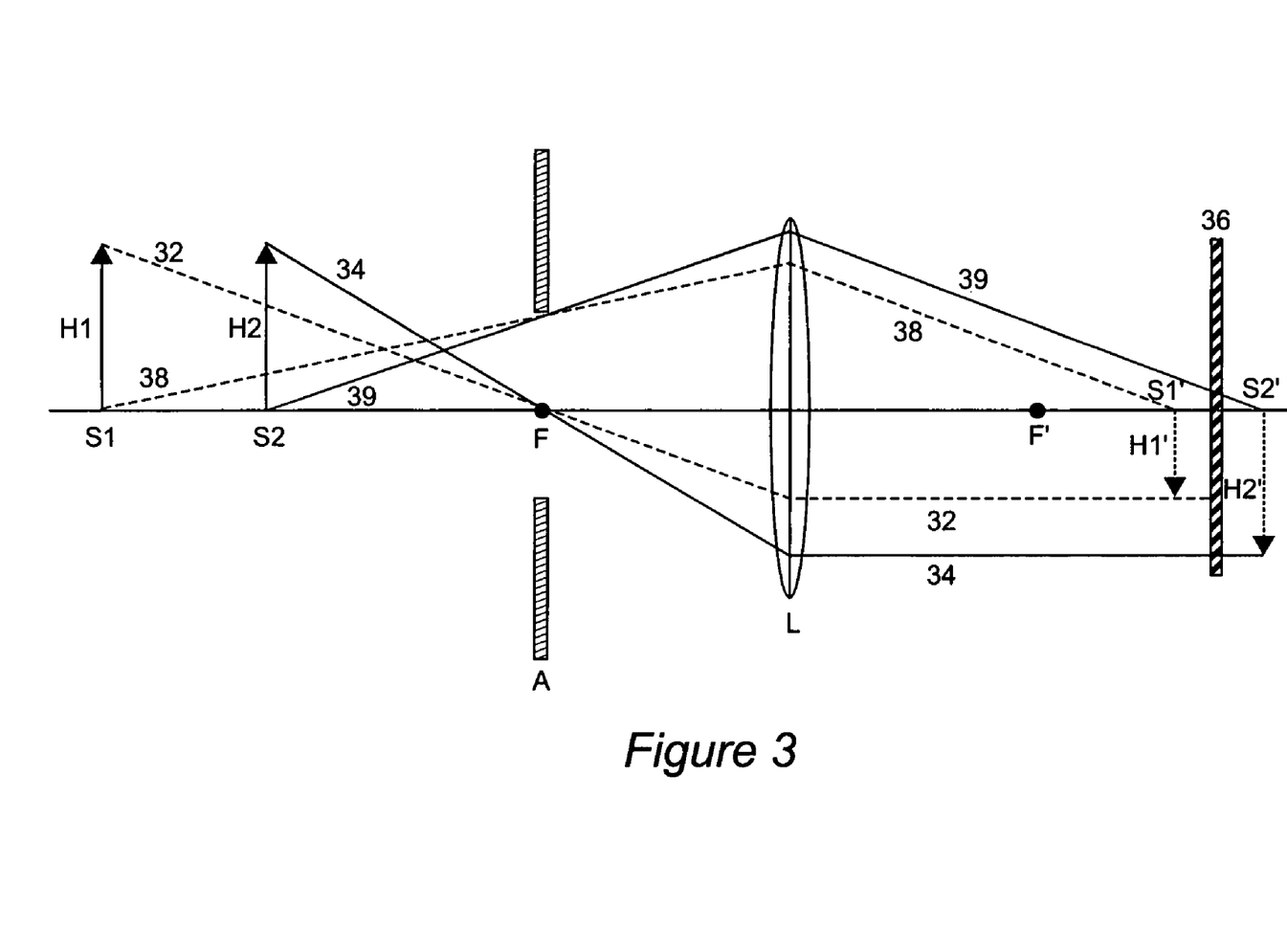
FIG. 3 is a schematic illustration of imaging by a conventional, image telecentric optical system.

Referring now to FIGS. 2 and 3, an object telecentric optical system and an image telecentric optical system are respectively shown. While these types of telecentric optical systems are known and the illustrations thereof are generalized to convey an understanding thereof, no feature of either telecentric system, as depicted or described below, is admitted to be prior art in regard to the present invention.

In the object telecentric system of FIG. 2, the primary objective 22 of the telecentric system is schematically depicted at M1 which can be either a refractive lens or a mirror (as in the Hippenmeyer patent discussed above). Objective M1 has front and rear focal points F1, F1', respectively. Lens 24 is a simplified representation of the objective lens L1 of a camera C and is located at F1' since it also serves as the entrance pupil of the camera objective. Lens 24 (L1) also has front and rear focal points F2, F2'. The sensor of the camera is indicated at 26 and can be moved toward or away from F2' to focus the camera, Two objects H1, H2 of the same size but at different locations S1, S2 at different distances from objective 22 are shown as in FIG. 1 above. These two objects can be understood as the same object at two different axial positions or two points of a single object as explained above for FIG. 1. Images H1', H2' are formed at S1', S2', respectively. S1' is depicted as preceding F2' since H1 is positioned at S1 which is outside of F1 for illustrative purposes. S2' is depicted as following F2' since H2 is positioned at S2 which is inside of F1, again, for illustrative purposes.

The far working distance is somewhat arbitrary but at infinity the primary image is at F1' and no image can be formed by L1. A sensor 26 located between S1' and S2', approximately as shown, would thus receive a defocused or blurred image of both H1 and H2 but the rays from the topmost points of both objects would be centered within the blurred images at $H_T$, as can be observed from principal rays 28. Note that in the object telecentric case, since the principal ray always passes through F1', located at the entrance pupil of the camera objective, both images share the same principal ray, unlike the conventional case where each image has a distinctly different principal ray.

By the same token, if either H1' or H2' is brought into focus by movement of image/sensor plane 26, the resulting image will be of a different size than the other focused image (and/or $H_T$) as in the conventional case. However, for a given location of the image plane 26, the centers of the blur circles from both images coincide, unlike the conventional case where they occur at two distinct points along the sensor. Thus, if the sensor is held fixed within a given depth of focus, the image magnification is constant over the entire depth of field which is typically limited to a very shallow depth. Note also that the field of view is limited by the diameter of the primary objective.

Referring now to FIG. 3, an image telecentric optical system is shown. Aperture A, which serves as the entrance pupil, is on the object side of the objective lens L. As in FIG. 2, two objects H1, H2 of equal size are shown at different locations S1, S2, respectively, which are at different axial distances from objective lens L. Front and back focal points F, F' of objective lens L are shown. The object can be much larger than the diameter of the lens as in the conventional case but is illustrated as smaller than lens L for clarity and comparison with other Figures.

Again, by tracing principal rays 32 and 34 from H1, H2 through the image telecentric lens system of FIG. 3, it is seen that a sensor 36, located as shown, will produce images H1' and H2' of objects H1 and H2. Both images are of different size and both are defocused. It will be noted, however, that, since the principal rays always pass through F, they emerge parallel to the optical axis. If sensor 36 is moved to focus either image or to an intermediate position as shown, the centers of the blur circles remain at fixed points on the sensor albeit at different heights.

A fortuitous and somewhat remarkable property of image telecentric optics, as pointed out by R. Kingslake, "Applied Optics and Optical Engineering", Vol. II, p. 208, Academic Press, 1965, and M. Watanabe and S. K. Nayar, "Telecentric Optics for Constant-Magnification Imaging", Technical Report CUCS-026-95, Dept. of Computer Science, Columbia University, New York, N.Y., USA, September 1995, is that of a having a constant effective f/# regardless of object/image position. In a conventional optical system, the effective f/# is increased as the image moves away from the nominal (infinity) focal plane. As can be seen in FIG. 1, the marginal ray, 19, from H2 crosses the axis at H2' farther away from the lens than does the marginal ray, 18, from H1 at H1', thus reducing the cone angle of the emergent beam and, hence, increasing the effective f/# which is defined as the ratio between the focal distance and the diameter of the entrance pupil. Image illuminance falls off as $1/(f/\#)^2$.

In an image telecentric system, it can be shown that the marginal rays, 38 and 39, as illustrated in FIG. 3, emerge parallel to each other for any pair of object/image distances, thus keeping constant the ratio of the focal length to the diameter of the entrance pupil. Note that the entrance pupil diameter goes up with corresponding nearer object position and farther image position, thus keeping the ratio constant. This constant effective f/# results in constant illuminance of the image regardless of object position if the object is illuminated in a consistent manner along the length of the axis.

Figure 4:
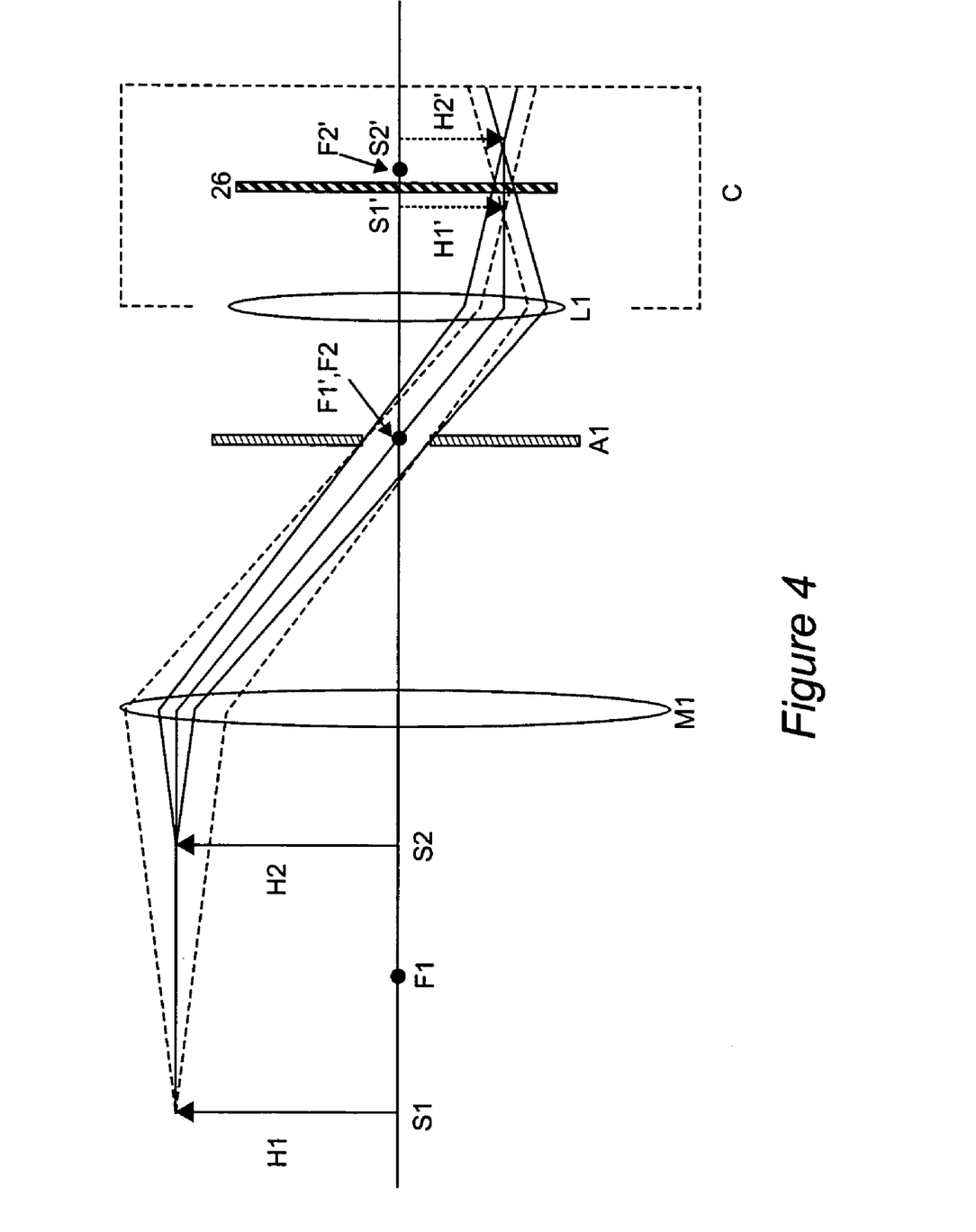
FIG. 4 is a schematic illustration of imaging by a doubly telecentric optical system in accordance with the invention, and FIG. 5 schematically depicts a generalized vision-based (e.g. OCR) system including the invention.

Referring now to FIG. 4, the doubly telecentric optical system in accordance with the invention will now be discussed. As in FIGS. 2 and 3, FIG. 4 also shows two objects H1, H2 of equal size at different locations S1, S2 which are of differing distance from the objective M1 of the optical system. These two objects can be the same object at two different axial positions or two points of a single object as explained above for FIG. 1. Again, objective element M1 has front and rear focal points F1, F1', respectively. Lens L1 is, again, the objective lens of a camera portion C and has front and rear focal points F2, F2' respectively. As discussed above, M1 and L1 are located such that the front focal point F2 of lens L1 coincides with the rear focal point F1' of objective element M1, where aperture A1 is located.

By following the principal rays from H1 and H2 through the doubly telecentric optical system of FIG. 4, it can be seen that focused images H1', H2' will be formed at different locations behind lens L1 but both images will be of the same size. Therefore, the doubly telecentric optical system in accordance with the invention will produce images of constant size and resolution regardless of distance between an object of interest and the lens and regardless of focus. In other words, the doubly telecentric optical system in accordance with the invention can be focused on an object over a substantial range of distances from the lens by movement of the imaging sensor without change of magnification or resolution.

The inventor has recognized that this property of the invention allows constant magnification and resolution imaging over a much larger range of distances than is possible with either object or image telecentric optical systems. Further, the inventor has recognized that constant magnification and resolution can be obtained over this much increased depth consistent with capturing well-focused images since alteration of focus does not alter magnification, as is the case with object and image telecentric optical systems.

The inventor has also discovered additional properties of the doubly telecentric optical system in accordance with the invention which allow improved automated imaging for numerous applications and may not have been previously recognized. Specifically, as alluded to above, the effective f-number of the doubly telecentric optical system does not change with focus as is characteristic of at least image telecentric optical systems. Furthermore, it can be shown that the hybrid system does not suffer from the $\cos^4 \theta$ fall-off of image illuminance characteristic of a traditional optical system since the principal rays are parallel to the optical axis in both object and image space and therefore perpendicular to the object and image planes respectively, thereby eliminating any angular dependence, thus providing a substantially more uniform image.

Further, there is a constant field of view over the entire range of focus of the doubly telecentric optical system. Therefore, features of an object which would be within the field of view at any given distance from the lens are not cut off if the object is close to the lens. In this regard, since resolution is constant with object distance from the lens no additional image processing is required to compensate for changes in resolution or magnification and the computational burden/overhead for doing so is avoided. No image data is lost or discarded in compensating for resolution variation, and therefore no aliasing is introduced as a result of subsampling, and performance of OCR, BCR, feature extraction or other machine vision software is improved. Furthermore, since no time is required for image processing to compensate for change of magnification and/or resolution, overall image processing time is significantly reduced and systems or devices controlled by such machine vision systems can be operated at increased throughput levels. Since resolution is constant at all distances there is no need to increase scan line rate at nearer distances which would otherwise place further restraints on throughput due to sensor bandwidth limitations.

Figure 5:
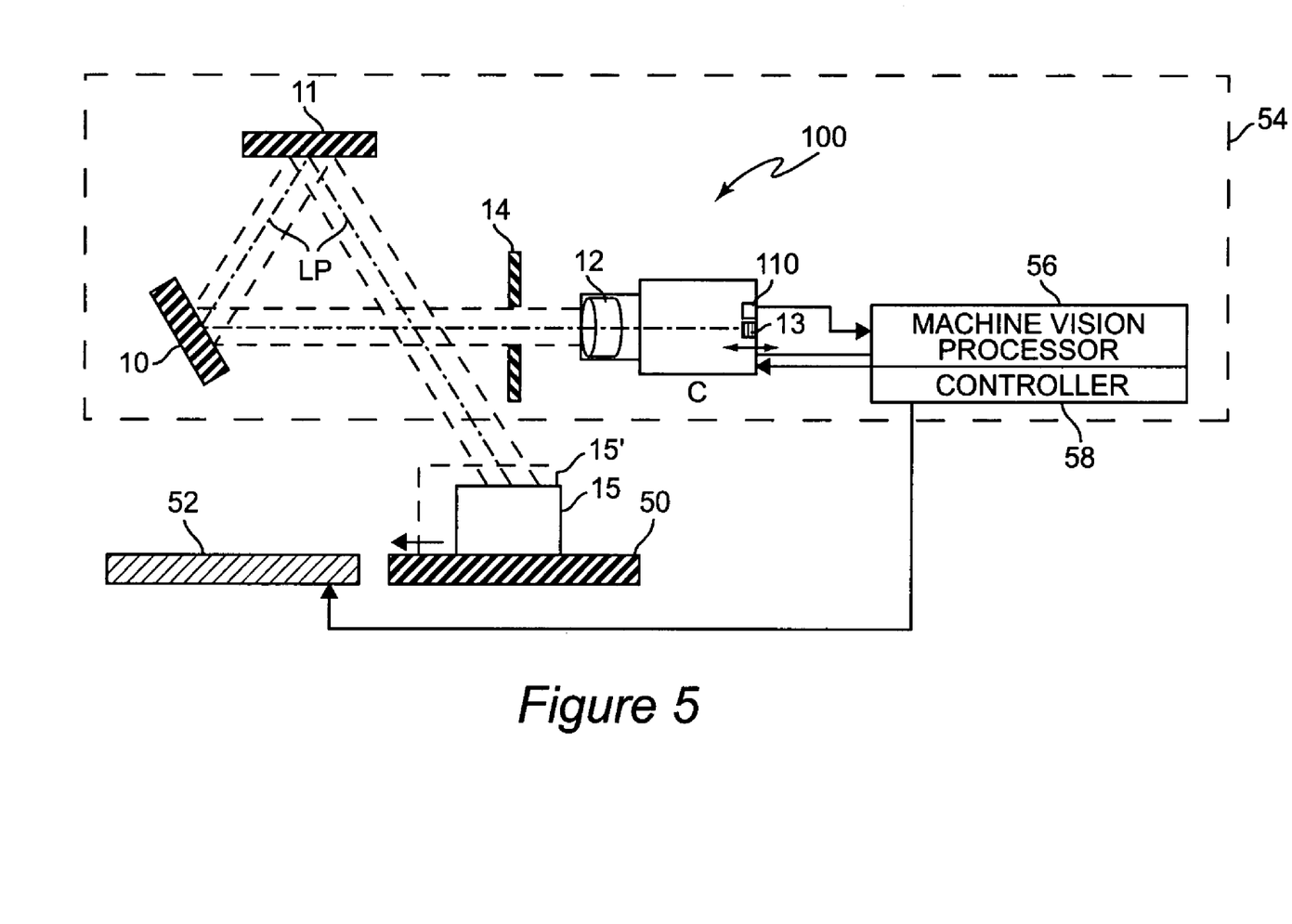

A generalized system controlled by a machine vision system employing the invention is schematically depicted in FIG. 5, which also depicts a preferred form of the invention. However, it should be understood that the system illustrated in FIG. 5 is to be regarded as exemplary and, to the extent FIG. 5 may reflect a particular application, the invention is not to be considered as limited thereto, either in regard to the type of machine vision employed (e.g. OCR, BCR, feature extraction, metrology, etc.) or overall system function (e.g. article sorting, automated inspection, measurement, guidance, etc.). Nevertheless, selective transport of articles 15 is depicted in FIG. 5 in the interest of clarity and to illustrate not only overall architecture of a generalized system but also the need in some environments for well-focused imaging over large differences in lens to object distance.

In the exemplary system illustrated in FIG. 5, articles 15 of random dimensions (e.g. 15') are illustrated as being transported by conveyor 50, A second conveyor 52 is controlled by the machine vision system 54 including the doubly telecentric optical system 100 in accordance with the invention. Information or features of interest are assumed to be on the top side of the respective objects. In this regard, it should be recognized that the orientation of the objects and features of interest and the corresponding orientation of the optical system may be arranged in any desired manner. However, the location of the features of interest relative to the camera lens cannot be regulated without the provision of a transparent structure against which the feature of interest is made to bear. Such a transparent structure may damage the objects, is subject to damage and wear and is difficult to maintain (e.g. because of smearing or depositing of dirt or other materials).

Since the objects 15 may be of essentially random size within a relatively wide range, as depicted, the height of the feature of interest and the distance from the optical system will vary widely. As alluded to above, a feature of interest having a given size (e.g. a three inch by five inch address label) on an object of low height may easily fit within the field/angle of view of a conventional lens but may exceed the field/angle of view on a tall object. That is, in terms of a conventional, non-telecentric lens, an area of given dimensions, when close to the lens, will subtend a greater angle that may exceed the angle of view of the lens and/or sensor. By the same token, with a conventional lens the image will be larger and the resolution higher when the feature of interest is close to the lens. Features of interest may also be located on different sides of the object and keystone distortion of conventional lenses will complicate image processing if the optical system is arranged to view the objects from oblique angles in order to view two or more sides of the object with the same optical system and sensor.

Optical system 100, discussed above with reference to FIG. 4 (in which M1 is depicted in a generalized form), preferably utilizes a concave strip mirror 11 as the objective element of the doubly telecentric optical system. The strip mirror 11 should have a width sufficient to accommodate the dimensions of a line scan or area scan sensor 13 in the camera portion C of the optical system. (The type of image sensor utilized in the camera C is not important to the practice of the invention.) The shape of the concave strip mirror is preferably spherical. The arc length across the ends of the strip mirror 11 determines the field of view of the doubly telecentric optical system and may be arbitrarily large. Use of a mirror is preferred since the folded catadioptric light path reduces overall dimensions of the optical system and a very large mirror can be made for a fraction of the cost of a refracting lens only a few inches in diameter.

Concave objective mirror 11 is preferably oriented at an angle to the axis of the remainder of the doubly telecentric optical system 100 to avoid imaging the optical system itself. The remainder of the light path LP may be directed at will, using angled (possibly moveable for scanning) preferably planar mirrors (e.g. 10). The system of FIG. 5 preferably includes a rangefinder or focus detection arrangement 110, the type and configuration of which is substantially unimportant to the practice of the invention and could be located in camera C or externally such as a light curtain or other dimensioning device. The output of the rangefinder or focus detection system is used to control axial shifting of the location of the image sensor 13 of camera C to allow capture of a well-focused image.

Focus adjustment by means of a moving sensor is preferable to that by a moving lens which is slow, less reliable, and much more complicated, since the relation of the lens to the auxiliary objective must remain fixed. Numerous arrangements will thus be apparent to those skilled in the art and the details thereof are not important to the practice of the invention. On the other hand, for some applications where the optical path can be made long and the range of focus suitably limited, focusing by lens motion may cause a change in resolution which may be acceptably limited.

Accordingly, a feature of interest on each object 15 will be imaged by camera C and optical system 100 as the object is transported by conveyor 50 and illuminated by light source LS. (Alternatively, a light source could be provided to illuminate the objects along light path LP.) The image of the feature will be well-focused as well as being of constant magnification and is resolution and consistent field of view, indicated by chain lines 55, over the entire focus range. The corresponding image data can thus represent the full resolution of which the optical system and image sensor are capable of producing, thus providing for high performance of the image processing software, in terms of accuracy.

Since resolution is constant, there is no need to increase scan line rate in order to maintain a constant aspect ratio as the object position gets nearer to the objective, thus reducing data output for nearer objects and/or allowing higher data rates for all object sizes. Since the image data is of constant resolution and magnification and not distorted by perspective (and not segmented for tall packages due to the field of view) the image processing for character recognition, bar code identification, measurement, feature extraction and the like can be executed in reduced time since no preprocessing of data to accommodate variation of magnification and/or resolution need be performed. By the same token, the optical system can be oriented to view more than one side of the object and the images will be orthographic and free of perspective distortion.

In this regard, the preprocessing to correct for perspective distortion or variation in magnification and resolution represents a processing burden of a magnitude similar to or even substantially greater than that of metrology, character recognition or feature extraction. Therefore, a result of the image processing may be available in a fraction (e.g. less than one-half) of the time which would be required without the avoidance of preprocessing in accordance with the invention. This feature of the invention allows the substantial meritorious effect of potentially multiplying (e.g. doubling or tripling) throughput of an expensive controlled system; greatly reducing the cost per operation thereof.

Since the overall system may be very expensive, such an increase in throughput, alone, would justify a very substantial cost of the optical system which also provides further performance benefits as described above. However, the use of a concave mirror in accordance with a preferred form of the invention allows an optical system that supports the above-described advantages to be provided very inexpensively and at a cost comparable to conventional optics (e.g. by the addition of an aperture plate and a curved mirror, suitably located, to existing optics in the system).

Image processor 56 receives image (pixel) data from the image sensor 13 of camera C and provides processing in accordance with the image to derive desired information. The type of processing is unimportant to the practice of the invention. However, it is important to recognize that the invention including a doubly telecentric optical system provides qualitatively and quantitatively enhanced performance from any software used, including existing software. That is, the optical system in accordance with the invention can be retrofitted into existing systems and will substantially improve throughput and accuracy thereof without additional modification.

The output of the processor is provided to a controller 58 which may be of any type or configuration suitable for the apparatus that it is to control. In the exemplary, generalized system of FIG. 5, a second conveyor 52 is provided that can be driven in either of two directions (e.g. into or out of the plane of the page) for sorting of objects 15 in accordance with the imaged feature. Further such additional conveyors (or their counterparts in other environments and applications) could be provided and controlled in accordance with a single imaging of the feature of interest and corresponding image processing thereof. For example, the OCR of zip-code information could control sorting into as many groups as may be desired and supported by the information.

In view of the foregoing, it is seen that the invention provides an optical system having numerous properties uniquely suited to many forms and applications of machine vision, including constant size and resolution while accommodating large variation in lens to object distance and consistent with focusing, avoidance of variation in light gathering or transmission with focus and consistent field of view over the full range of focus. The invention avoids preprocessing of image data to alter effective resolution and/or magnification to compensate for variation thereof (as would be characteristic of and required by other optical systems) and allows image processing at the full resolution delivered by the optical system for increased accuracy while increasing throughput of the controlled system. The optical system can be retrofitted into existing systems without further modification (and potentially by addition of only two inexpensive optical elements) to produce substantially enhanced performance of such existing systems.

While the invention has been described in terms of a single preferred embodiment, those skilled in the art will recognize that the invention can be practiced with modification within the spirit and scope of the appended claims.

What is claimed is:

1. An optical system comprising
a camera comprising a camera objective and means for focusing an image, and
a doubly telecentric optical system including a mirror, wherein the back focal plane of the mirror is coincident with the front plane of the camera objective, and wherein the doubly telecentric optical system includes an aperture at the juncture of the back focal plane of said mirror and the front focal plane of the camera objective
whereby well-focused images of substantially constant magnification and resolution are produced over a range of distances of objects from said mirror.

2. The optical system of claim 1, wherein the camera includes means for shifting a location of an image sensor.

3. The optical system of claim 1, wherein the doubly telecentric optical system includes a curved concave mirror or mirror strip as an objective element thereof.

4. The optical system of claim 3, wherein the curved concave mirror or mirror strip is spherical.

5. The optical system of claim 3, wherein the curved concave mirror or mirror strip is aspherical.

6. The optical system of claim 3, wherein said curved mirror is a mirror strip.

7. The optical system of claim 3, wherein the camera includes means for shifting a location of an image sensor.

8. The optical system of claim 1, wherein the location shifting means is of a line scan variety.

9. The optical system of claim 1, wherein the location shifting means is of an area scan variety.

10. An optical system as recited in claim 7, wherein said means for shifting a location of said image sensor includes means responsive to a distance between said objective element and an object to be imaged.

11. The optical system of claim 1, wherein an objective lens of said camera is a secondary objective of said doubly telecentric optical system.

12. A machine vision controlled system including
a controllable means for performing a function,
a doubly telecentric optical system having a concave mirror as an objective element thereof, and a camera wherein the back focal plane of the mirror is coincident with the front focal plane of an objective lens of the camera and wherein the doubly telecentric optical system includes an aperture at the juncture of the back focal plane of the mirror and the front focal plane of the objective lens of the camera, said camera including means for shifting a location of an image sensor, and
means for processing data derived from said image sensor to control said controllable means, whereby well-focused images of substantially constant magnification and resolution are produced over a range of distances of objects from said mirror.

13. A machine vision system as recited in claim 12, further including means for controlling said means for shifting a location of said image sensor responsive to a distance between said objective element and an object to be imaged.

14. A machine vision controllable system according to claim 12 wherein the controllable means includes an optical character recognition system.

15. A machine vision controllable system according to claim 12, wherein the optical character recognition system includes at least one conveyor for transporting articles for view by the doubly telecentric optical system.

16. A machine vision controllable system according to claim 12, wherein the optical character recognition system includes at least one planar mirror.

17. A machine vision controllable system according to claim 12, wherein the optical character recognition system includes a focus detection arrangement.

18. A sorting method for articles having visible information on a face of each said article, wherein said articles may be irregularly sized, comprising the steps of:

moving, by automation, each article to a doubly telecentric optical system including a camera, wherein the back focal plane of the mirror is coincident with the front focal plane of an objective lens of the camera and wherein the doubly telecentric optical system includes an aperture at the juncture of the back focal plane of the mirror and the front focal plane of the objective lens of the camera, said camera including means for shifting a location of an image sensor, then imaging the visible information on each article at substantially constant magnification and resolution whereby well-focused images of substantially constant magnification and resolution are produced over a range of distances of faces of said irregularly sized objects from said mirror.

19. The sorting method of claim 18, wherein said visible information is a zip-code.

* * * * *